(12) United States Patent
Sagara et al.

(10) Patent No.: US 7,344,077 B2
(45) Date of Patent: Mar. 18, 2008

(54) OPTICAL PICKUP CONTROL APPARATUS, OPTICAL PICKUP CONTROL METHOD, AND OPTICAL DISC APPARATUS

(75) Inventors: Seiichi Sagara, Chiba (JP); Atsushi Ishimaru, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/320,695

(22) Filed: Dec. 30, 2005

(65) Prior Publication Data
US 2006/0164949 A1    Jul. 27, 2006

(30) Foreign Application Priority Data
Jan. 12, 2005   (JP) .............................. 2005-005672

(51) Int. Cl.
G06K 7/10 (2006.01)
G06K 7/14 (2006.01)
G11B 7/00 (2006.01)

(52) U.S. Cl. ................. 235/455; 369/44.29; 369/53.28
(58) Field of Classification Search ........... 369/112.01, 369/112.02, 44.23, 44.29, 53, 19, 53.31, 53.35, 369/112.23, 112.24, 94; 235/455
See application file for complete search history.

(56) References Cited

FOREIGN PATENT DOCUMENTS

JP        2004-095106 A    *    3/2004

OTHER PUBLICATIONS

English translation of Japenese application JP-2004-095106 A.*

* cited by examiner

Primary Examiner—Uyen Chau N. Le
Assistant Examiner—Merlin Brito Peguero
(74) Attorney, Agent, or Firm—Oblon, Spivak, McClelland, Maier & Neustadt, P.C.

(57) ABSTRACT

The present invention has been made to adequately and quickly adjust the spherical aberration and focus bias in an optical pickup. In the present invention, evaluation values are measured on a plurality of respective measurement points each determined by a combination of a spherical aberration correction value and focus bias value and a two-variable function having the spherical aberration correction value and focus bias value as variables is approximated to the evaluation values. Based on the two-variable function obtained by the approximation, the optimal value of the spherical aberration correction value and focus bias value on which the evaluation value becomes optimal is calculated. As a result, it is possible to adequately and quickly adjust the spherical aberration and focus bias in an optical pickup.

9 Claims, 11 Drawing Sheets

OPTICAL PICKUP CONTROL APPARATUS, OPTICAL PICKUP CONTROL METHOD, AND OPTICAL DISC APPARATUS

CROSS REFERENCE TO RELATED APPLICATIONS

The present invention contains subject matter related to Japanese Patent Application JP 2005-005672 filed in Japanese Patent Office on Jan. 12, 2005, the entire contents of which being incorporated herein by reference.

BACKGROUND OF THE INVENTION

1. Field of the Invention

The present invention relates to an optical pickup control apparatus, an optical pickup control method, and an optical disc apparatus and, more particularly, to an optical pickup control apparatus and optical pickup control method suitably applied to an optical disc apparatus in which there is a need to correct the spherical aberration.

2. Description of the Related Art

An increase in the storage density of an optical disc has been demanded. In order to increase the storage density of an optical disc, a method of increasing the numerical aperture (NA) of an objective lens (increase in aperture ratio) or method of shortening the wavelength of a light beam can be considered.

For example, in an optical disc apparatus compliant with Blu-ray Disc (Registered Trademark) specification, a blue-violet laser having a wavelength of 405 nm and an objective lens having a numerical aperture of 0.85 are used to thereby achieve a surface recording density about five times that of a conventional Digital Versatile Disc (DVD).

Such an optical disc apparatus compliant with Blu-ray Disc (Registered Trademark) specification is configured to perform focus servo for focusing a laser beam on a disc recording surface and tracking servo for allowing a laser beam to trace the track on a disc surface. When it comes to the focus servo, in particular, application of an adequate focus bias to a focus loop realizes adequate servo movement of the objective lens.

Spherical aberration caused by an error in a base material for protecting the recording layer of an optical disc increases in proportion to the fourth power of the numerical aperture. Further, in a multilayer disc, spherical aberration varies in each recording surface. Thus, the optical disc apparatus compliant with Blu-ray Disc™ specification needs to certainly correct the spherical aberration and, therefore, is provided with a spherical aberration correction mechanism using an expander lens or liquid crystal element as an optical pickup.

Various adjustment methods for obtaining an adequate spherical aberration correction value and focus bias value based on the evaluation value such as the amplitude or jitter of an RF signal have been proposed for such an optical disc apparatus (refer to, for example, Jpn. Pat. Appln. Laid-Open Publication No. 2004-95106).

SUMMARY OF THE INVENTION

Figure 1:
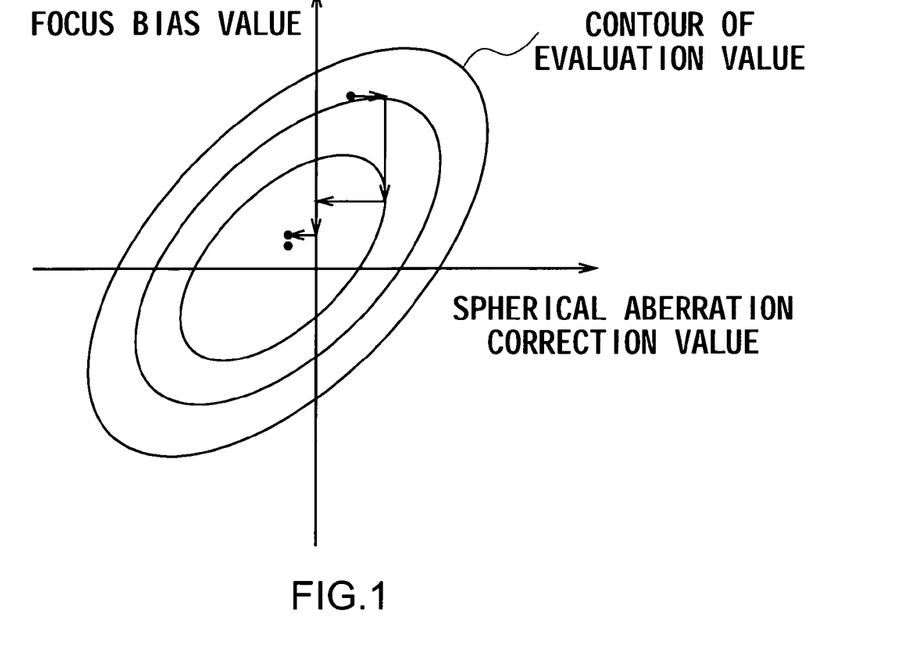
FIG. 1 is a view schematically explaining the convergence of a spherical aberration correction value and focus bias value.

However, the abovementioned evaluation value depends on both the spherical aberration correction value and focus bias value and, therefore, a method that optimally adjusts one of the spherical aberration correction value and focus bias value first and then adjusts the other cannot set both the spherical aberration correction value and focus bias value to an optimal value (FIG. 1).

Although it is possible to adjust both the spherical aberration correction value and focus bias value to an optimal value by alternately adjusting their values in this case, it takes time to adjust them to an optimal value.

Figure 2:
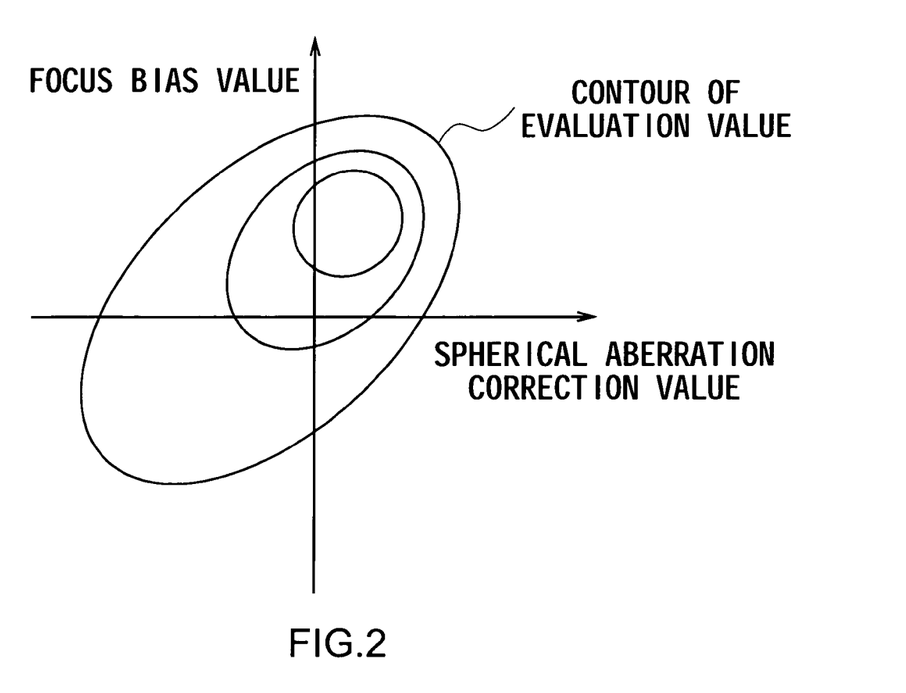
FIG. 2 is a view schematically explaining the convergence of a spherical aberration correction value and focus bias value in the case where astigmatism is present.

Further, in the case where the two-dimensional position of an optimal value (minimum value, etc.) of the evaluation value is biased due to influence of the astigmatism or the like, as shown in FIG. 2, if a spherical aberration correction value and focus bias value corresponding to the optimal value are used to set the spherical aberration and focus bias in a simple manner, this will have the opposite effect that the movement margin for the spherical aberration or focus servo is reduced.

The present invention has been made in view of the above points, and an object thereof is to provide an optical pickup control apparatus, an optical pickup control method, and an optical disc apparatus capable of adequately and quickly adjusting the spherical aberration and focus bias in an optical pickup.

To solve the above problem, according to one embodiment of the present invention, there is provided an optical pickup control apparatus provided in an optical disc apparatus that allows an optical pickup to irradiate an optical disc with a laser beam to record/reproduce data onto or from the optical disc, including: a spherical aberration correction means for correcting the spherical aberration of the laser beam incident on the optical disc based on a spherical aberration correction value; a focus bias adjustment means for adjusting the focus servo in the optical pickup for the optical disc based on a focus bias value; an evaluation value generation means for generating an evaluation value from a signal based on a reflection light obtained by the optical pickup; a function approximation means for approximating two-variable function having the spherical aberration correction value and focus bias value as variables to the evaluation values based on the spherical aberration correction values, focus bias values and evaluation values on a plurality of respective measurement points determined by combinations of the spherical aberration correction values and focus bias values; and an optimal value calculation means for calculating, as an optimal value, the spherical aberration correction value and focus bias value on which the evaluation value becomes optimal based on the two-variable function obtained by the approximation of the function approximation means. With the above configuration, it is possible to adequately and quickly adjust the spherical aberration and focus bias in the optical pickup.

According to one embodiment of the present invention, there is provided an optical pickup control method used in an optical disc apparatus that allows an optical pickup to irradiate an optical disc with a laser beam to record/reproduce data onto or from the optical disc, including: an evaluation value measurement step of measuring an evaluation value obtained from a signal based on a reflection light obtained by the optical pickup on a plurality of measurement points each determined by a combination of a spherical aberration correction value for correcting the spherical aberration of the laser beam incident on the optical disc and a focus bias value of the focus servo in the optical pickup for the optical disc; a function approximation step of approximating two-variable function having the spherical aberration correction value and focus bias value as variables to the evaluation values based on the spherical aberration correction values, focus bias values and evaluation values; and an optimal value calculation step of calculating, as an optimal value, the spherical aberration correction value and focus bias value on which the evaluation value becomes optimal based on the two-variable function obtained by the approximation of the function approximation step. With the above configuration, it is possible to adequately and quickly adjust the spherical aberration and focus bias in the optical pickup.

According to one embodiment of the present invention, there is provided an optical disc apparatus that allows an optical pickup to irradiate an optical disc with a laser beam to record/reproduce data onto or from the optical disc, including: a spherical aberration correction means for correcting the spherical aberration of the laser beam incident on the optical disc based on a spherical aberration correction value; a focus bias adjustment means for adjusting the focus servo in the optical pickup for the optical disc based on a focus bias value; an evaluation value generation means for generating an evaluation value from a signal based on a reflection light obtained by the optical pickup; a function approximation means for approximating two-variable function having the spherical aberration correction value and focus bias value as variables to the evaluation values based on the spherical aberration correction values, focus bias values and evaluation values on a plurality of respective measurement points determined by combinations of the spherical aberration correction values and focus bias values; and an optimal value calculation means for calculating, as an optimal value, the spherical aberration correction value and focus bias value on which the evaluation value becomes optimal based on the two-variable function obtained by the approximation of the function approximation means. With the above configuration, it is possible to adequately and quickly adjust the spherical aberration and focus bias in the optical pickup.

According to one embodiment of the present invention, it is possible to calculate the optimal spherical aberration correction value and focus bias value using a two-variable function obtained by approximation and thereby the optical pickup control apparatus, optical pickup control method, and optical disc apparatus capable of adequately and quickly adjusting the spherical aberration and focus bias in the optical pickup can be realized.

The nature, principle and utility of the invention will become more apparent from the following detailed description when read in conjunction with the accompanying drawings in which like parts are designate by like reference numerals or characters.

DETAILED DESCRIPTION OF THE PREFERRED EMBODIMENTS

An embodiment of the present invention will be described below in detail with reference to accompanying drawings.

(1) Entire Configuration of Optical Disc Apparatus

Figure 3:
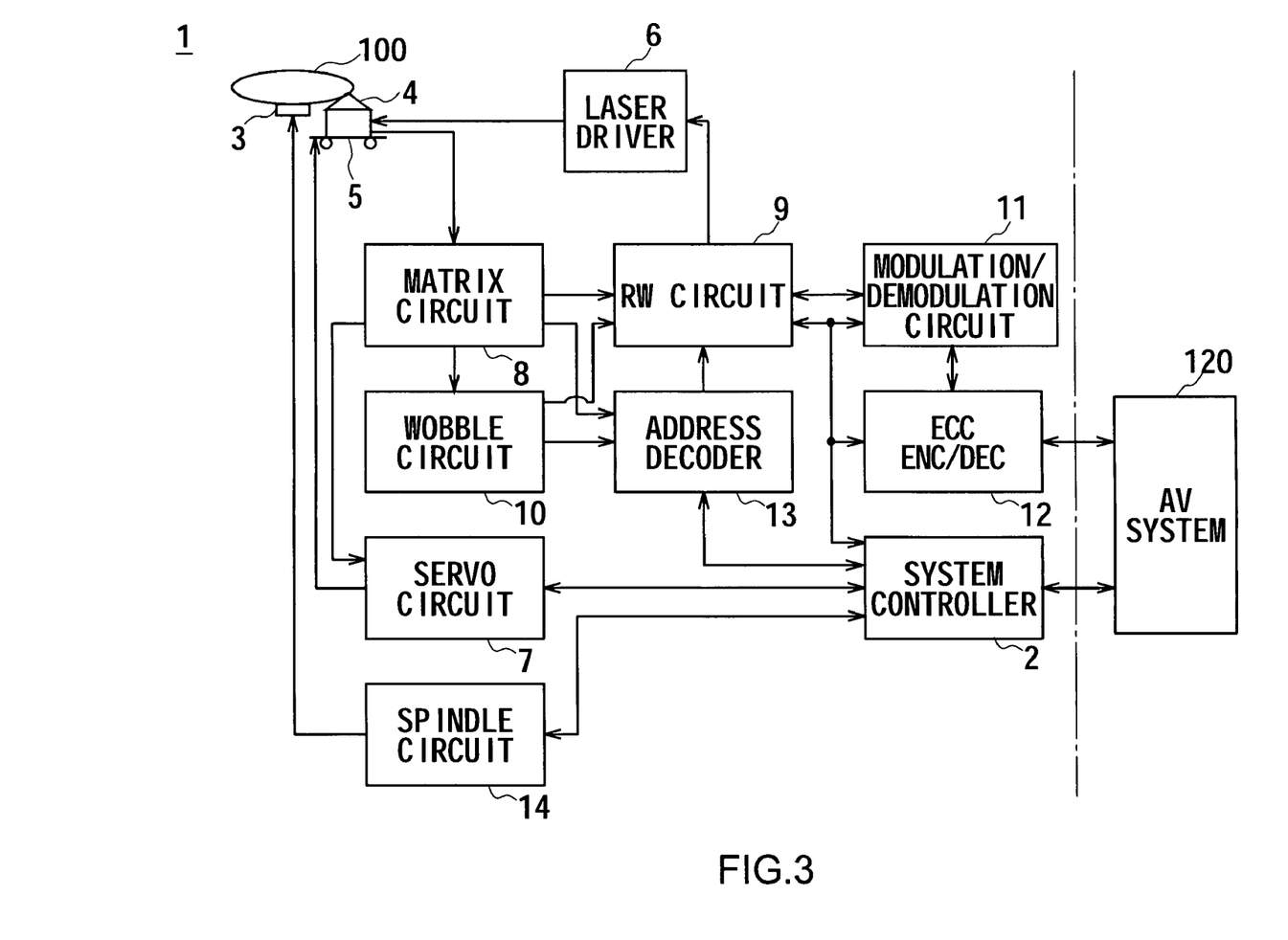
FIG. 3 is a block diagram showing a configuration of an optical disc apparatus according to one embodiment of the present invention.

In FIG. 3, reference numeral 1 represents an optical disc apparatus according to one embodiment of the present invention, which is compliant with Blu-ray Disc™ specification. A system controller 2 serving as a control unit is configured to manage and control the entire optical disc apparatus 1 including an optical pickup 4 and the like according to a basic program or application program stored in a non-volatile memory (not shown). The optical disc apparatus 1 operates according to a read/write command supplied from an external device and records/reproduces data onto or from an optical disc 100.

The optical disc 100 is a Blue-Ray Disc™ and has a surface on which wobbling grooves serving as recording tracks are formed. Address In PreGroove (ADIP) information and the like are embedded as the wobbling of the track.

The optical disc 100 is placed on a not shown turntable and is driven and rotated by a spindle motor 3 at data recording/reproduction time. Then, the optical pickup 4 reads out the ADIP information that has been embedded as wobbling of the groove track on the optical disc 100. Further, at data recoding time, the optical pickup 4 records data on the track as a phase change mark, which is read out at data reproduction time.

Figure 4:
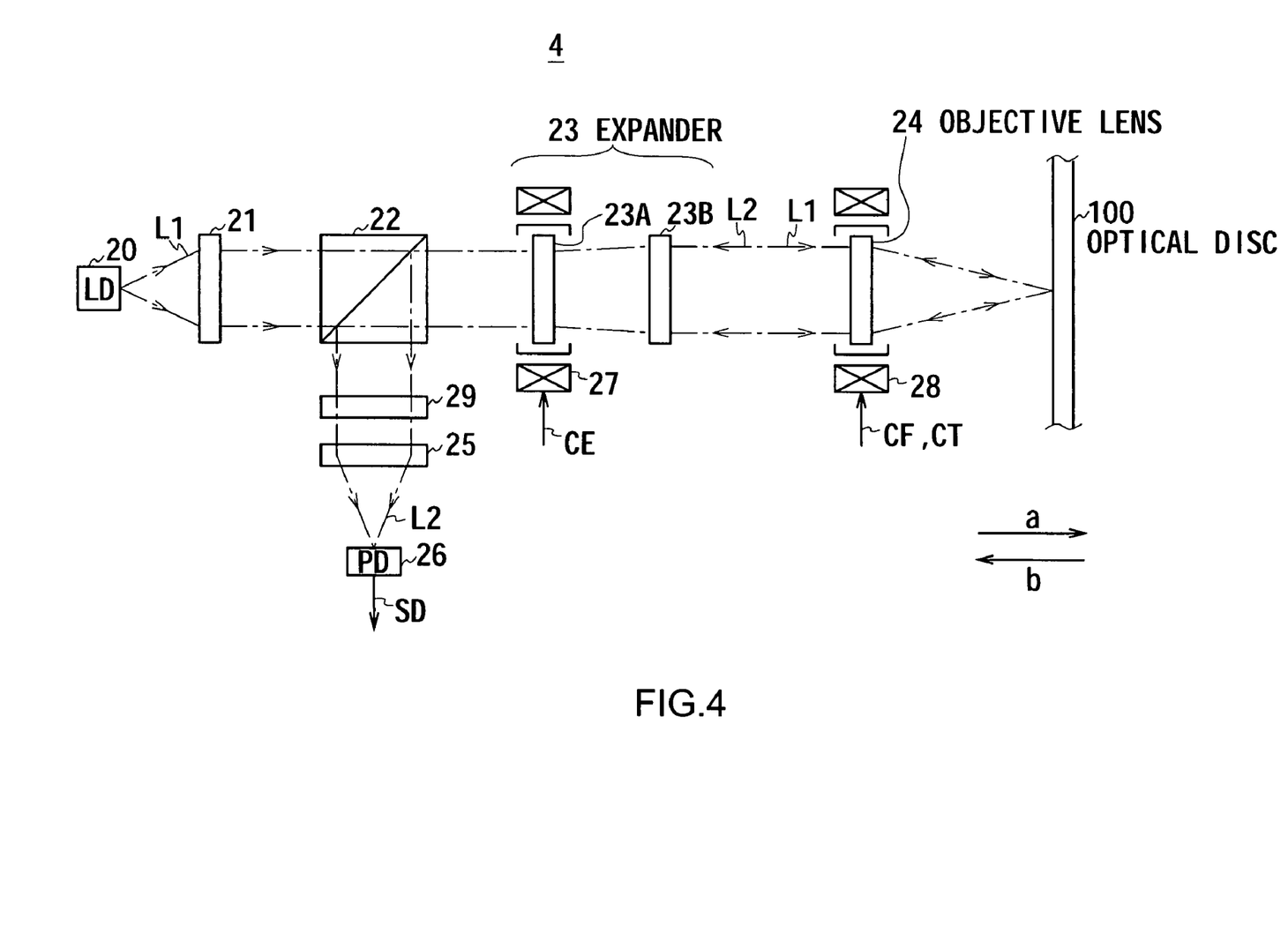
FIG. 4 is a view schematically showing a configuration of an optical pickup.

As shown in FIG. 4, the optical pickup 4 emits a laser beam L1 from a laser diode 20. The laser beam L1 then passes through a collimator lens 21, a beam splitter 22, a movable lens 23A and fixed lens 23B of an expander 23 that corrects the spherical aberration of the laser beam, and an objective lens 24 serving as an output terminal of the laser beam and reaches optical disc 100.

The optical pickup 4 is configured to correct the spherical aberration of the laser beam L1, which is caused due to a large numerical aperture (0.85) of the objective lens 24, using the expander 23 serving as a spherical aberration correction means.

More specifically, the movable lens 23A of the expander 23 is supported by an actuator 27 so as to be movable in the directions denoted by arrows a and b. An expander servo signal CE from a servo circuit 7 (FIG. 3) drives the actuator 27 to thereby adequately correct the spherical aberration of the laser beam L1.

The objective lens 24 is supported by a biaxial actuator 28 serving as a drive means so as to be movable in the focus direction (directions of arrows a and b) and tracking direction. A focus servo signal CF and tracking servo signal CT from the servo circuit 7 (FIG. 3) drive the biaxial actuator 28 to thereby control the focusing and tracking of the laser beam L1.

In the optical pickup 4, a reflected laser beam L2 reflected by the recoding surface of the optical disc 100 passes through the objective lens 24, fixed lens 23b and movable lens 23A of the expander 23 and is then reflected by the beam splitter 22. The laser beam L2 then passes through a diffraction grating 29 and a collimator lens 25 and enters a photodetector 26.

The photodetector 26 serving as a light reception means generates a light reception signal corresponding to the incident light and supplies the light reception signal to a matrix circuit 8 shown in FIG. 3. The matrix circuit 8 generates a reproduction RF signal, a focus error signal, a tracking error signal, and a push-pull signal based on the light reception signals supplied from a plurality of reception elements of the photodetector 26. The matrix circuit 8 then supplies the reproduction RF signal, focus error signal and tracking error signal, and push-pull signal to a reader/writer circuit 9, a servo circuit 7, and a wobble circuit 10, respectively.

The reader/writer circuit 9 binarizes the reproduction RF signal, performs reproduction clock generation processing using a PLL as a reproduction clock generation means, and the like. The reader/writer circuit 9 reproduces the data that has been read out as a phase change mark and supplies the reproduction data to a modulation/demodulation circuit 11. The modulation/demodulation circuit 11 serves both as a decoder and encoder for use in reproducing and recording data. At data reproduction time, the modulation/demodulation circuit 11 demodulates run-length limited code based on a reproduction clock as decode processing.

An ECC encoder/decoder 12 performs ECC encode processing to add error correction code at data recording time and performs ECC decode processing to correct error at data reproduction time. At data reproduction time, the ECC encoder/decoder 12 takes the data that has been demodulated in the modulation/demodulation circuit 11 in an internal memory, performs error detection/correction processing and deinterleaves to generate reproduction data, and, according to an instruction from the system controller 2, transfers the reproduction data to an external Audio-Visual (AV) system 120.

The wobble circuit 10 generates ADIP information from the push-pull signal and supplies the ADIP information to an address decoder 13. The address decoder 13 decodes the ADIP information to generate an address value and supplies the address value to the system controller 2. Further, the address decoder 13 performs PLL processing for a wobble signal supplied from the wobble circuit 10 to generate a clock and supplies the clock, which serves, for example, as an encode clock for use in data recording, to the respective circuits.

At data recording time, the ECC encoder/decoder 12 buffers recording data supplied from the AV system 120 in an internal memory (not shown). Then the ECC encoder/decoder 12 encodes the buffered recording data. More specifically, the ECC encoder/decoder 12 adds error correction code or adds interleave, subcode or the like. After that, the ECC encoder/decoder 12 supplies the encoded recording data to the modulation/demodulation circuit 11. The modulation/demodulation circuit 11 modulates the ECC encoded recording data according to RLL (1-7) PP method and supplies the modulated data to the reader/writer circuit 9.

The reader/writer circuit 9 fine adjusts a recording power in accordance with characteristics of the recording layer, laser beam spot shape, recording linear velocity, and the like to obtain an optimal recording power, adjusts a laser drive pulse waveform, and the like based on the recording data to generate a laser drive pulse and supplies the laser drive pulse to a laser driver 6.

The laser driver 6 generates a laser drive current based on the laser drive pulse and causes a laser diode 20 of the optical pickup 4 to emit a light. This forms a pit (phase change mark) corresponding to the recording data on the optical disc 100.

The laser driver 6 has a so-called Auto Power Control (APC) circuit. This APC circuit maintains a laser output at a constant value irrespective of environmental temperature while monitoring a laser output power by means of the output from a laser power monitor detector (not shown) provided in the optical pickup 4. Target values of the laser output at data recording time and data reproduction time are given from the system controller 2. The APC circuit adjusts the laser output levels to the target values.

The servo circuit 7 generates a focus servo drive signal, a tracking servo drive signal, a sled servo drive signal based on the focus error signal and tracking error signal supplied from the matrix circuit 8 to activate servo movement.

More specifically, in response to the focus error signal and tracking error signal, the servo circuit 7 generates a focus drive signal and tracking drive signal to drive the biaxial actuator 28 (FIG. 4) in the optical pickup 4 to thereby move the objective lens 24 in the focus direction and tracking direction. As a result, a tracking servo loop and focus servo loop each constituted by the optical pickup 4, matrix circuit 8, servo circuit 7, and biaxial actuator 28 are formed.

The servo circuit 7 turns off the tracking servo loop according to a track jump instruction issued from the system controller 2 and outputs a jump drive signal to thereby allow the optical pickup 4 to perform a track jump operation.

The servo circuit 7 generates a sled drive signal based on a sled error signal which has been obtained as a lower frequency component of the tracking error signal or access execution control from the system controller 2 to drive a sled mechanism 5. The sled mechanism 5 has a drive mechanism including a main shaft for supporting the optical pickup 4, a sled motor, a transmission gear, and the like. When the sled mechanism 5 drives the sled motor in response to the sled drive signal, a required sliding movement of the optical pickup 4 is performed.

The spindle servo circuit 14 drives and rotates the spindle motor 3. More specifically, the spindle servo circuit 14 obtains a clock which has been generated in the PLL processing for the wobble signal as the rotation speed information of the spindle motor 3 and compares this rotation speed information of the spindle motor 3 with predetermined reference speed information to thereby generate a spindle error signal. Further, since a reproduction clock (clock serving as a reference for decode processing) to be generated by the PLL in the reader/writer circuit 9 becomes the current rotation speed information of the spindle motor 3 at data reproduction time, it is possible for the spindle servo circuit 14 to generate the spindle error signal by comparing the reproduction clock with a predetermined reference clock.

The spindle servo circuit 14 outputs the generated spindle drive signal in response to the spindle error signal to thereby drive and rotate the spindle motor 3. Further, the spindle servo circuit 14 generates a spindle drive signal in response to a spindle kick/break control signal from the system controller 2 to thereby start, stop, accelerate, or decelerate the spindle motor 3.

The various operations in the above servo system and recording/reproduction system are controlled by the system controller 2 constituted by a microcomputer. In addition, the system controller 2 performs various processing in response to a command from the external AV system 120.

When, for example, a write command is issued from the AV system 120, the system controller 2 firstly moves the optical pickup 4 to a target address and then allows it to perform recording operation of data (various types of video data (MPEG-2, etc., or audio data) transferred from the AV system 120.

When, for example, a read command for acquiring data transfer (MPEG-2 video data, etc.) recorded on the optical disc 100 is issued from the AV system 120, the system controller 2 firstly performs seek operation control with a requested address as a target. More specifically, the system controller 2 instructs the servo circuit 7 to allow the optical pickup 4 to access the target address specified by the seek command.

After that, the system controller 2 performs operation control needed to transfer the data on the specified data area to the AV system 120. More specifically, the system controller 2 reads out the data from the optical disc 100, allows the reader/writer circuit 9, modulation/demodulation circuit 11, ECC encoder/decoder 12 to perform decoding/buffering and the like to thereby transfer the requested data to the AV system 120.

At the above data recording/reproduction time, the system controller 2 uses an ADIP address detected by the wobble circuit 10 and address decoder 13 to perform access control or recording/reproduction operation control.

(2) Spherical Aberration and Focus Bias Adjustment Method According to One Embodiment of the Present Invention A method of adjusting the spherical aberration and focus bias used in the optical disc apparatus 1 according to one embodiment of the present invention will next be described.

When the optical disc 100 is inserted, the system controller 2 of the optical disc apparatus 1 measures the jitter value of a reproduction RF signal while appropriately changing a combination of spherical aberration correction value x and focus bias value y (i.e., measurement point on a two-dimensional plane defined by spherical aberration correction value and focus bias value) and stores the measured jitter value as evaluation value z on the measurement point.

Here, a two-variable function (i.e., z=f(x, y)) having the spherical aberration correction value x and focus bias value y as variables relative to the evaluation value z on the measurement point is assumed. As a concrete example of the two-variable function, the following expression (1) or (2) can be considered.

$$f(x,y) = p_1 x^2 + p_2 y^2 + p_3 x + p_4 y + p_5 \quad (1)$$

$$f(x,y) = p_1 x^2 + p_2 xy + p_3 y^2 + p_4 x + p_5 y + p_6 \quad (2)$$

Figure 5A:
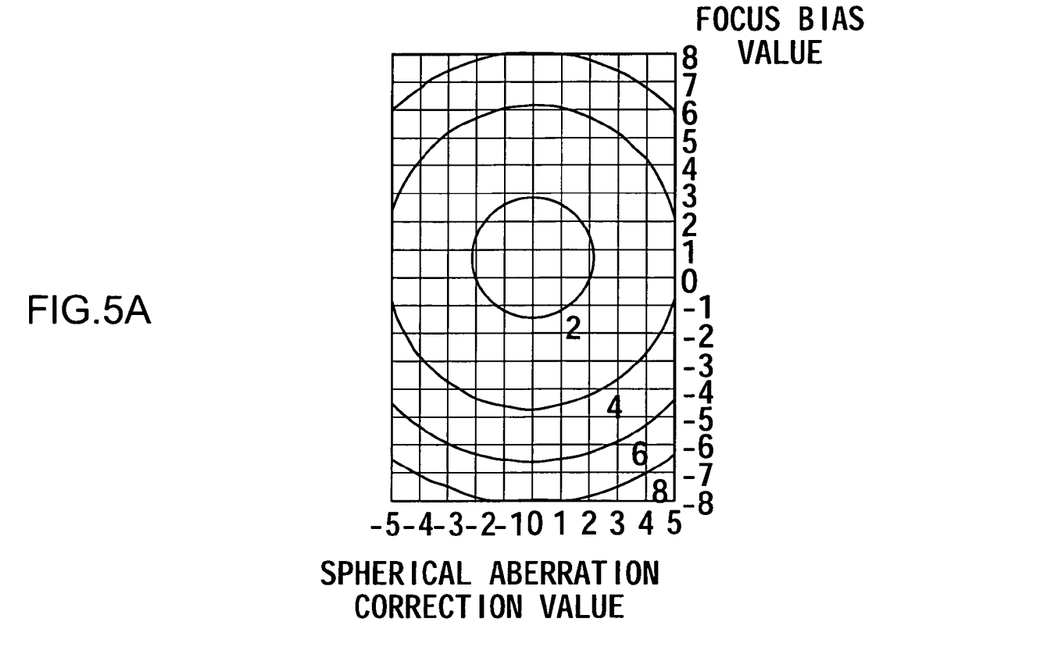
FIGS. 5A and 5B are characteristic views each representing evaluation values in the case where a jitter value is used as the evaluation value and an expression (1) is used.
Figure 5B:
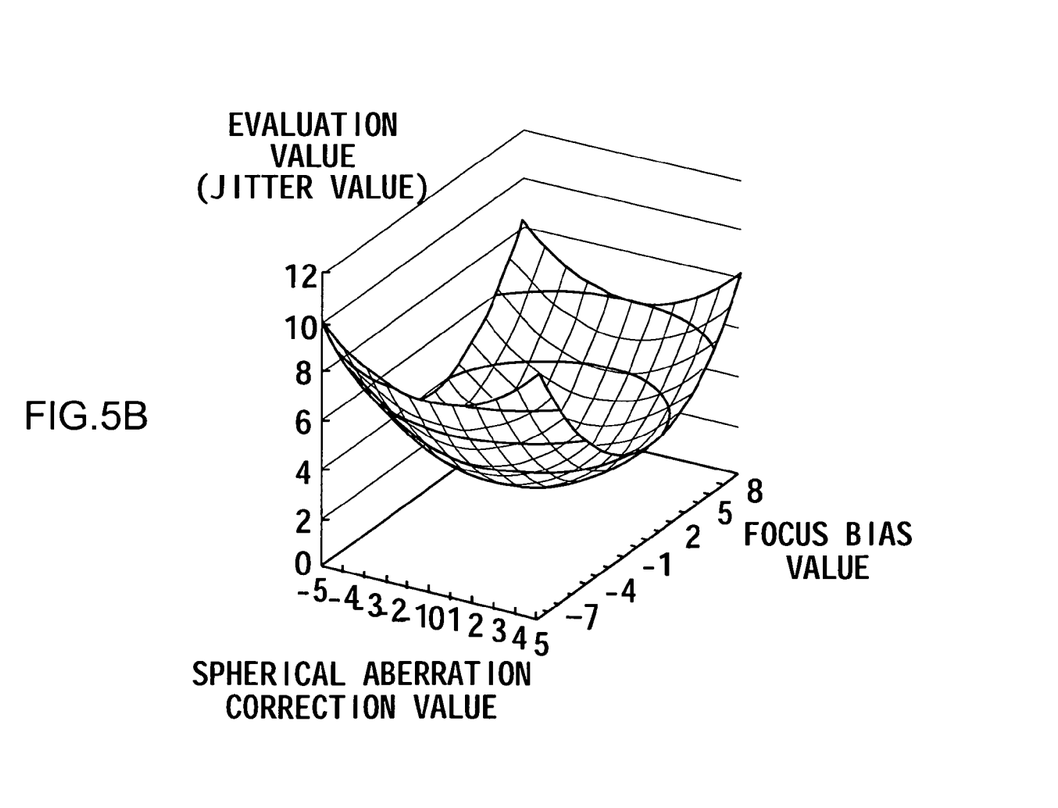

FIG. 5A shows the pattern (contour) of the evaluation value z on a two-dimensional plane defined by combinations of the spherical aberration correction values and focus bias values in the case where the above expression (1) is used. The pattern exhibits concentric ellipses with no bias centering on the position corresponding to the minimum value of evaluation value z. FIG. 5B 3-dimensionally represents the pattern of evaluation value z, in which evaluation value z is plotted on the vertical axis. The pattern exhibits concaved concentric ellipses centering on the position corresponding to the minimum value of evaluation value z.

Figure 6A:
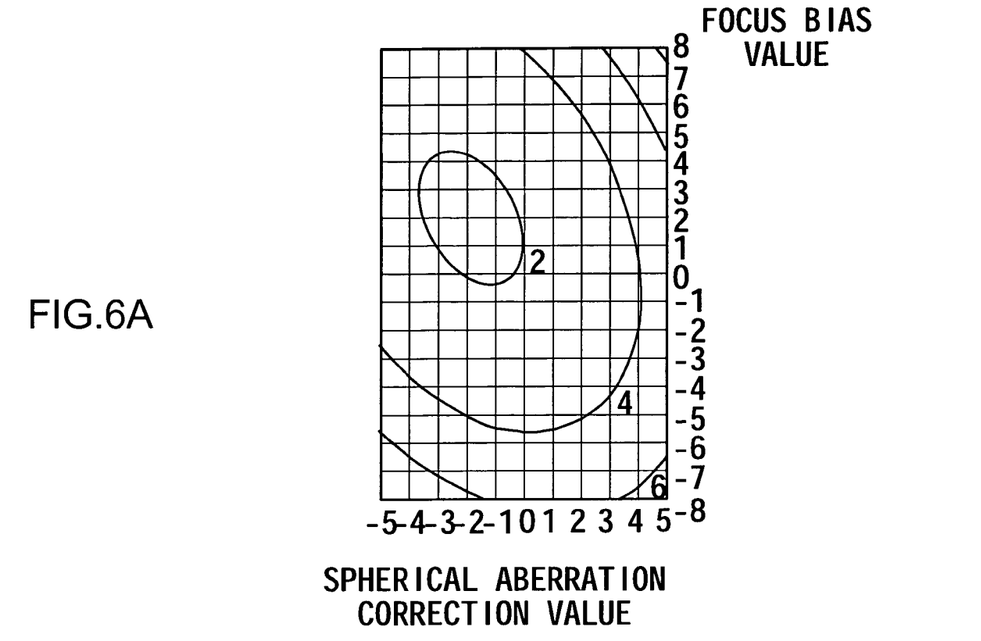
FIGS. 6A and 6B are characteristic views each representing evaluation values in the case where a jitter value is used as the evaluation value and an expression (2) is used.
Figure 6B:
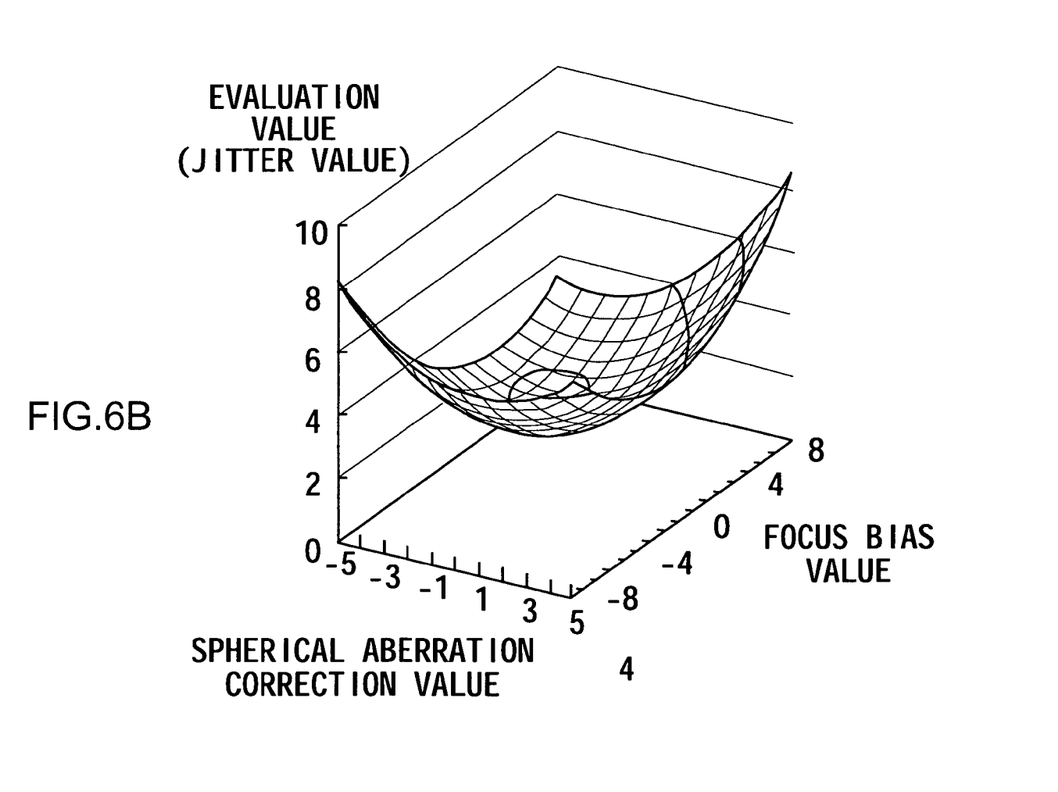

FIG. 6A shows the contour of the evaluation value z on a two-dimensional plane defined by combinations of the spherical aberration correction values and focus bias values in the case where the above expression (2) is used. The pattern exhibits biased concentric ellipses centering on the position corresponding to the minimum value of evaluation value z. FIG. 6B 3-dimensionally represents the pattern of evaluation value z, in which evaluation value z is plotted on the vertical axis. The pattern exhibits concaved concentric ellipses centering on the position corresponding to the minimum value of evaluation value z.

Hereinafter, a case where the expression (1) is used will be described. In the case where the two-variable function represented by the expression (1) is used, it is possible to calculate unknown coefficients $p_1$ to $p_5$ by obtaining measurement points not less than 5. The number of measurement points is not limited as long as it is more than a required number. The more number of measurement points is used, the more the accuracy is enhanced; whereas the less the number of measurement points is used, the shorter the processing time. In the case where measurement points more than a required number, coefficients are calculated using a least-square method. Three types of methods (i.e., evaluation value measurement method) for obtaining required measurement points will be described later.

In such two-variable function, the optimal two-dimensional position (referred to as optimal spherical aberration correction value $x_0$ and optimal focus bias value $y_0$) on which evaluation value 2 becomes the minimum corresponds to the two-dimensional center of a given constant evaluation value $Z_r$. Accordingly, the optimal spherical aberration correction value $x_0$ and optimal focus bias value $y_0$ can be calculated using the following expression.

$$\begin{cases} \frac{\partial z}{\partial x} = 0, \\ \frac{\partial z}{\partial y} = 0 \end{cases} \quad (3)$$

To be more precise, in the case where the two-variable function represented by the expression (1) is used, the optimal spherical aberration correction value $x_0$ and optimal focus bias value $y_0$ can be calculated using the following expression.

$$x_0 = \frac{-p_3}{2p_1}, \quad y_0 = \frac{-p_4}{2p_2} \quad (4)$$

As described above, the system controller 2 of the optical disc apparatus 1 measures the evaluation values z while changing spherical aberration correction value x and focus bias value y, approximates the measured evaluation values z to the expression (1), and uses the expression (3) to calculate the optimal spherical aberration correction value $x_0$ and optimal focus bias value $y_0$.

Then the system controller 2 uses the calculated optimal spherical aberration correction value $x_0$ and optimal focus bias value $y_0$ to perform recording/reproduction of data onto or from the optical disc 100.

(3) Evaluation Value Measurement Method

Next, three methods (evaluation value measurement methods) of obtaining measurement points on which the evaluation values for approximating the two-variable function are measured will next be described.

(3-1) Fixed Area Measurement Method

Firstly, a fixed area measurement method, which is the simplest method, will be described. This method is effective for the case where the measurement operation can be started at the position relatively close to the optimal value or the case where the evaluation value can stably be obtained even if the focus bias value and spherical aberration are significantly changed.

Figure 7:
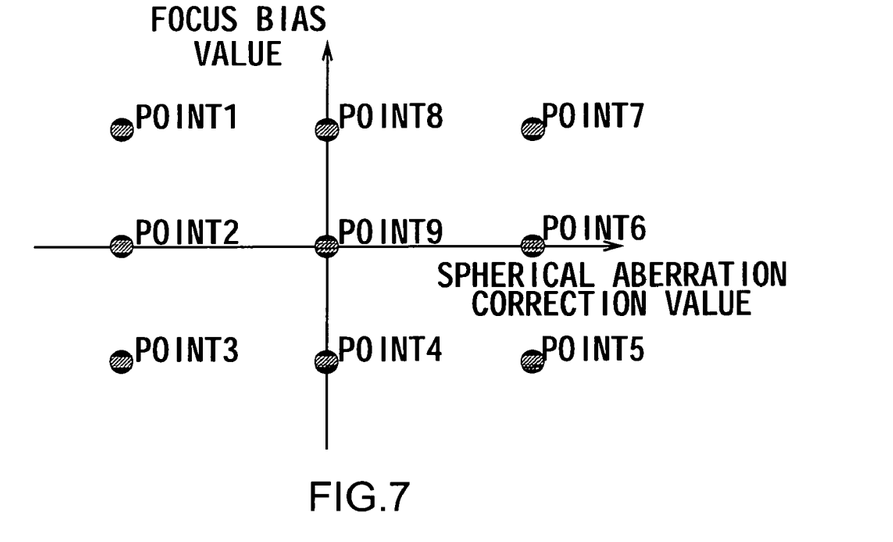
FIG. 7 is a view schematically explaining a fixed area measurement method.

In the fixed area measurement method, a plurality of measurement points defined by the spherical aberration correction values and focus bias values are previously determined on a two-dimensional plane as shown in FIG. 7, and the evaluation value z is measured on the determined measurement points. Although nine measurement points from measurement points 1 to 9 are plotted in a matrix manner in FIG. 7, the number of measurement points may appropriately be increased or decreased. Further, the plot pattern may appropriately be changed, for example, to a concentric pattern.

(3-2) Limited Area Measurement Method

A limited area measurement method will next be described. This method previously estimates the area within which the evaluation value can stably be measured with tracking servo failure taken into consideration and measures the evaluation value z while changing the focus bias value and spherical aberration correction value within the estimated area.

In the optical disc apparatus 1, in practice, the area having an amplitude of the tracking error signal larger than a predetermined value is set as the measurement target area. More specifically, as shown in FIG. 7, the system controller 2 of the optical disc apparatus 1 changes the focus bias value while monitoring the tracking error signal in a state where the spherical aberration correction value is fixed to an initial value and sets the area within which the amplitude of the tracking error signal is larger than a given value as the measurement target area.

Figure 8:
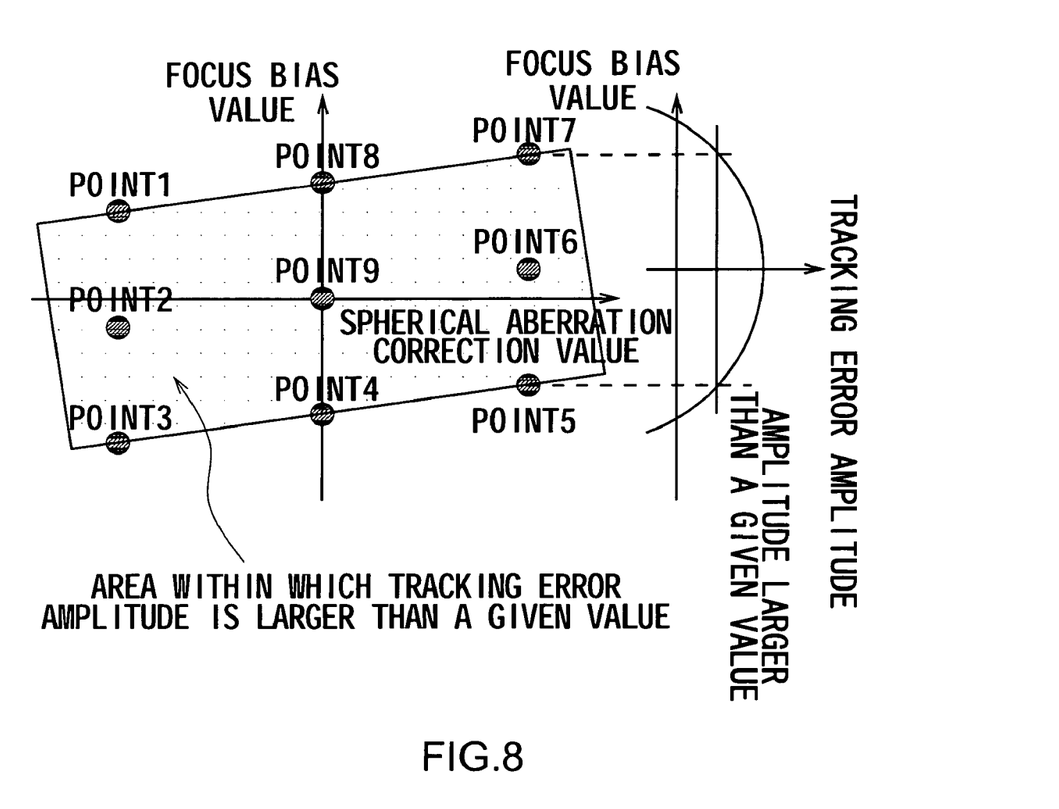
FIG. 8 is a view schematically explaining a limited area measurement method.

The system controller 2 then appropriately sets a plurality of measurement points within the set measurement target area and measures the evaluation values z on the set measurement points. Although nine measurement points from measurement points 1 to 9 are set in a matrix manner in FIG. 8, the number of measurement points may appropriately be increased or decreased. Further, the setting pattern may appropriately be changed, for example, to a concentric pattern.

(3-3) Evaluation Value Search Measurement Method

An evaluation value search method sets a given constant reference evaluation value $z_{ref}$ and searches for a plurality of two-dimensional positions (i.e., measurement points) that have the reference evaluation value $z_{ref}$. Then the spherical aberration correction values x and focus bias values y on the respective measurement points are used to approximate the two-variable function. The optimal spherical aberration correction value x0 and optimal focus bias value y0 thus obtained are positioned at the center of the contour connecting the reference evaluation values $z_{ref}$ on a two-dimensional plane.

Thus, in the case where the contour representing the evaluation values is biased due to influence of astigmatism, if the reference evaluation values $z_{ref}$ is set to a limit value needed for recording/reproducing data on the optical disc 100, the optimal spherical aberration correction value $x_0$ and optimal focus bias value $y_0$ are to be positioned at the center of the recording and reproduction enabled area of the optical disc 100 on a two-dimensional plane, increasing the operation margin to the maximum extent possible to allow stable recording/reproduction operation.

However, it takes time to search the measurement points that have the abovementioned reference evaluation value. A simple method is available in order to cope with this problem. That is, the method uses evaluation values on the respective measurement points obtained by the fixed area measurement method or limited area measurement method to perform quadratic curve approximation only with a single variable, calculates measurement points that have the reference evaluation values $z_{ref}$ from a quadratic curve function, and approximates the measurement points to the two-variable function.

For example, the fixed area measurement method is firstly performed to approximate measurement points 1, 2, and 3 with the focus bias value as a variable to a quadratic curve. Similarly, measurement points 8, 9, 4, and 7, 6, 5 are approximated to a quadratic curve. As a result, mathematical expressions corresponding to three quadratic curves obtained by the approximation are obtained.

Measurement points that have the reference evaluation value $Z_{ref}$ are then specified on the three quadratic curves thus obtained. Two measurement points that have the reference evaluation value $Z_{ref}$ can be obtained for each quadratic curve, that is, a total of six measurement points can be obtained on three quadratic curves.

Then, a total of seven measurement points obtained by adding the above six measurement points and the minimum value of a quadratic curve obtained by approximating the measurement points 8, 9, and 4 are used to approximate the two-variable function. As a result, it is possible to obtain the optimal spherical aberration correction value $x_0$ and optimal focus bias value $y_0$ in less time.

(4) Optimal Spherical Aberration Correction Value and Optimal Focus Bias Value Search Procedure An optimal value search procedure in which the optical disc apparatus 1 finds and sets the optimal spherical aberration correction value $x_0$ and optimal focus bias value $y_0$ according to a spherical aberration correction and focus bias value correction control program which is an application program will next be described with reference to flowcharts. Hereinafter, the optimal value search procedure will be described on respective cases using the fixed area measurement method, limited area measurement method, and evaluation value search measurement method.

Figure 9:
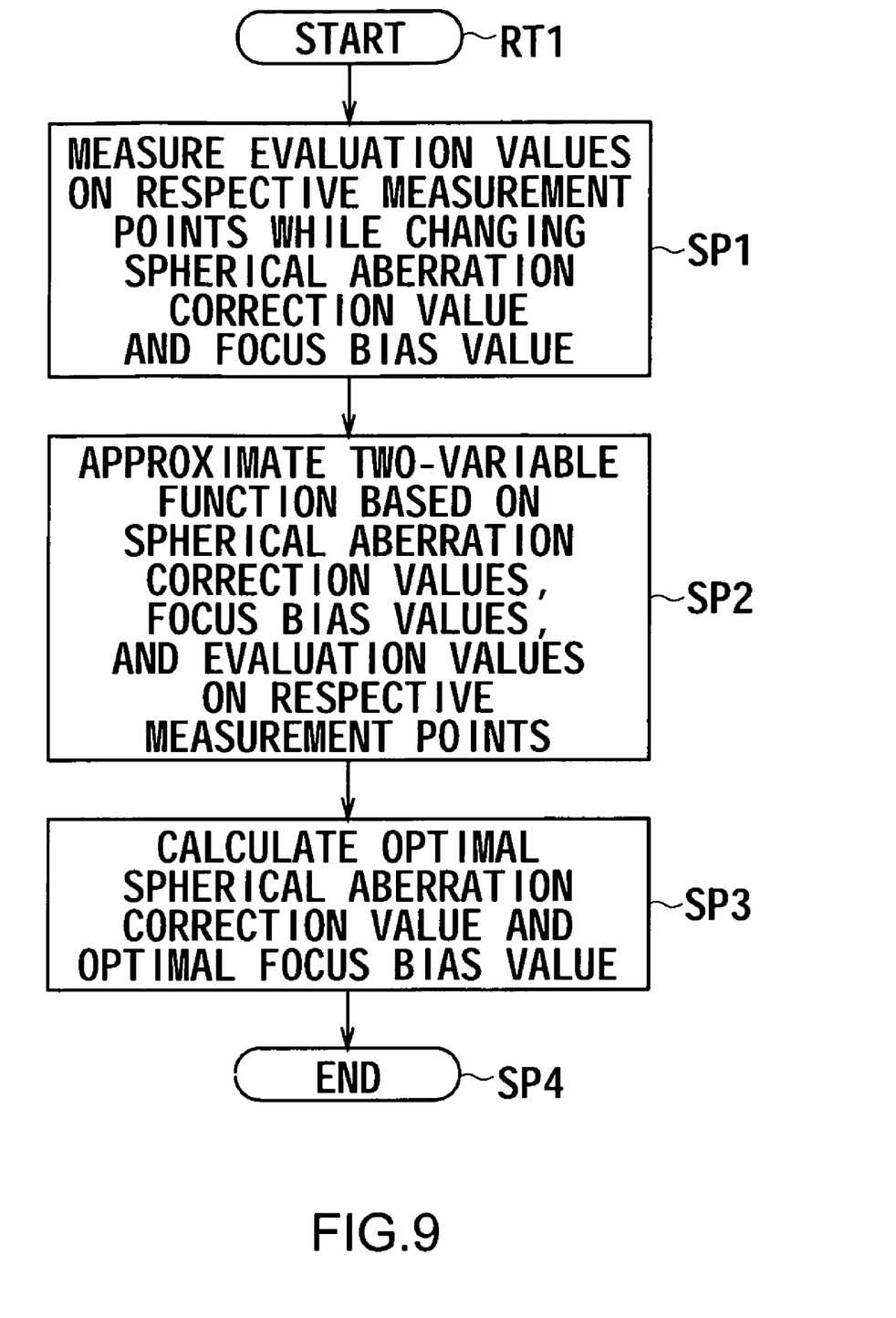
FIG. 9 is a flowchart showing an optimal value search procedure using the fixed area measurement method.

The optimal value search procedure using the fixed area measurement method will firstly be described with reference to the flowchart of FIG. 9. The system controller 2 of the optical disc apparatus 1 enters a start step of an optimal value search procedure routine RT1 and then shifts to step SP1. In step SP1, the system controller 2 measures the evaluation values z on a plurality of previously determined measurement points and then shifts to step SP2.

In step SP2, the system controller 2 approximates the two-variable function based on the spherical aberration correction values, focus bias values, and measured evaluation values on the respective measurement points and then shifts to step SP3.

In step SP3, the system controller 2 calculates the optimal spherical aberration correction value $x_0$ and optimal focus bias value $y_0$ using the two-variable function obtained by the approximation and then shifts to step SP4 so as to end this routine.

Figure 10:
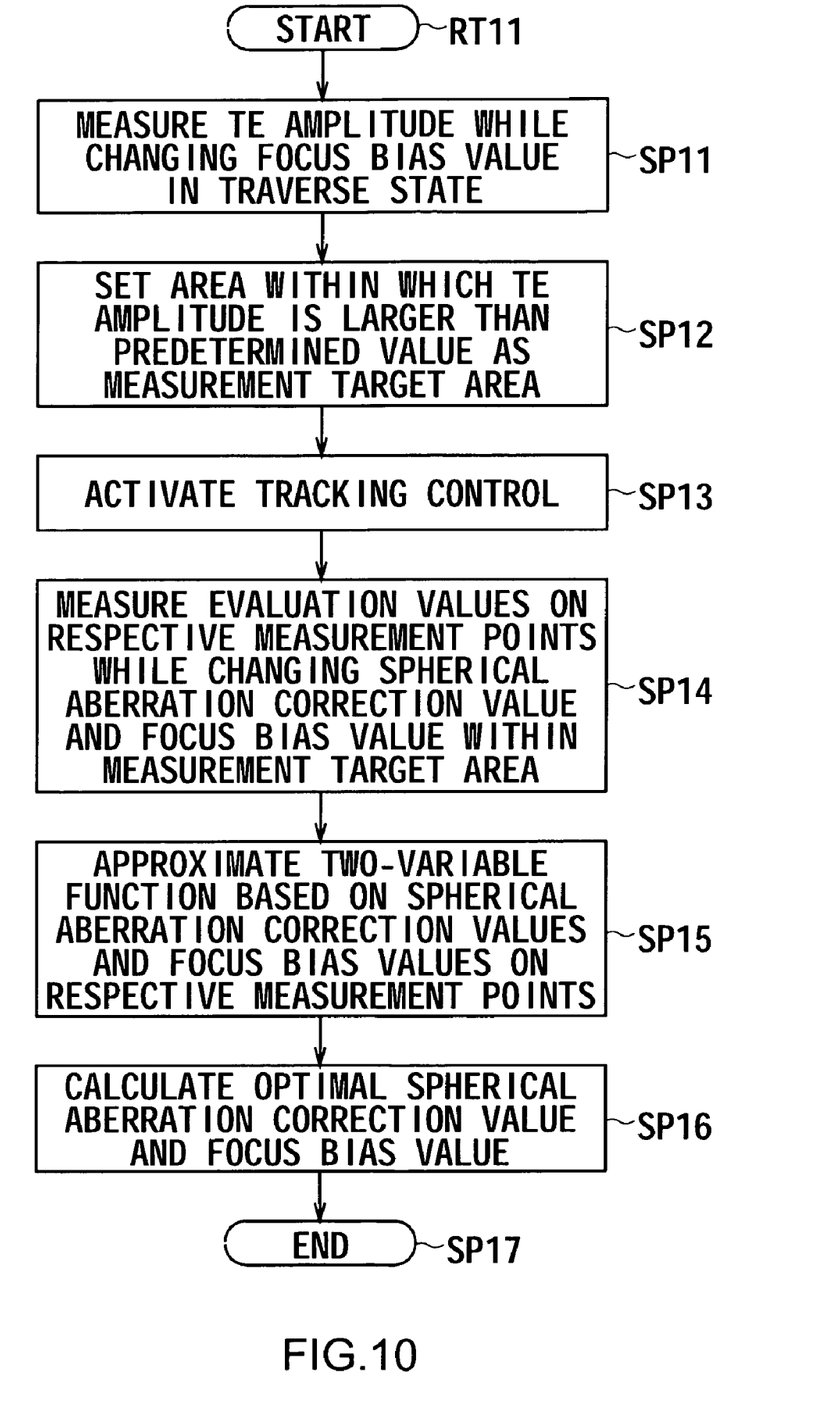
FIG. 10 is a flowchart showing an optimal value search procedure using the limited area measurement method.

The optimal value search procedure using the limited area measurement method will next be described with reference to the flowchart of FIG. 10. The system controller 2 of the optical disc apparatus 1 enters a start step of an optimal value search procedure routine RT2 and then shifts to step SP11. In step SP11, the system controller 2 puts the optical pickup 4 in a traverse state (i.e., state where tracking control is off), changes the focus bias value while monitoring a tracking error signal with the spherical aberration correction value fixed to a predetermined initial value, and shifts to step SP12.

In step SP12, the system controller 2 sets the area within which the amplitude of the tracking error signal is larger than a predetermined value as the measurement target area and shifts to step SP13.

In step SP13, the system controller 2 activates the tracking control and shifts to step SP14.

In step SP14, the system controller 2 sets a plurality of measurement points within the measurement target area, measures the evaluation values z on the respective measurement points, and shifts to step SP15.

In step SP15, the system controller 2 approximates the two-variable function based on the spherical aberration correction values, focus bias values, and measured evaluation values on the respective measurement points and shifts to step SP16.

In step SP16, the system controller 2 caluculates the optimal spherical aberration correction value $x_0$ and optimal focus bias value $y_0$ using the two-variable function obtained by the approximation and shifts to step SP17 so as to end this routine.

Figure 11:
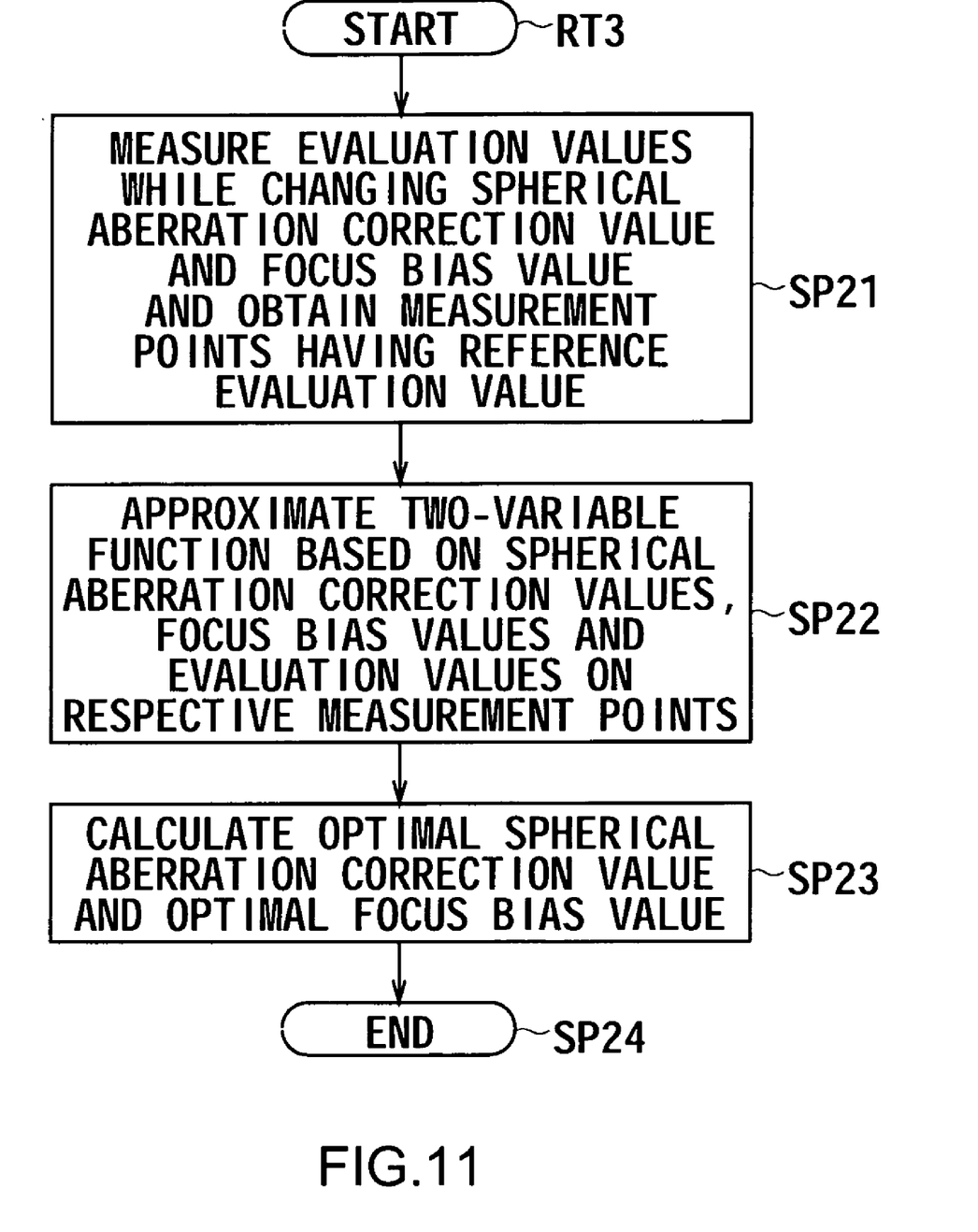
FIG. 11 is a flowchart showing an optimal value search procedure using an evaluation value search measurement method.

The optimal value search procedure using the evaluation value search measurement method will next be described with reference to the flowchart of FIG. 11. The system controller 2 of the optical disc apparatus 1 enters a start step of an optimal value search procedure routine RT3 and then shifts to step SP21. In step SP21, the system controller 2 measures the evaluation values z while changing the spherical aberration correction values x and focus bias values y, searches for a plurality of measurement points that have the reference evaluation value $z_{ref}$, and shifts to step SP22.

In step SP22, the system controller 2 approximates the two-variable function based on the spherical aberration correction values, focus bias values, and measured evaluation values on the respective measurement points, which have been obtained in step SP21, and shifts to step SP23.

In step SP23, the system controller 2 uses the two-variable function obtained by the approximation to calculate the optimal spherical aberration correction value $x_0$ and optimal focus bias value $y_0$ and shifts to SP24 so as to end this routine.

(5) Operation and Effect

With the above configuration, when initializing the focus bias and expander 23, the system controller 2 of the optical disc apparatus 1 measures jitter values on a plurality of respective measurement points as the evaluation value z and approximates the two-variable function using the spherical aberration correction values x, focus bias values y, and evaluation values z on the respective measurement points.

Then, based on the two-variable function, the system controller 2 calculates the optimal spherical aberration correction value $x_0$ and optimal focus bias value $y_0$ on which the optimal (minimum) evaluation value z can be obtained and uses the calculated optimal spherical aberration correction value $x_0$ and optimal focus bias value $y_0$ to initialize the focus bias and expander 23.

As a result, the optical disc apparatus 1 can adjust both the spherical aberration correction value and focus bias value in the optical pickup 4 to an adequate value at the same time.

In the case where using the limited area measurement method, the optical disc apparatus 1 sets the area within which the amplitude of the tracking error signal is larger than a predetermined value as the measurement target area and plots the measurement points within the measurement target area to thereby stably measure the evaluation value z. As a result, it is possible to adequately and quickly adjust the spherical aberration correction value and focus bias value.

Further, in the case where using the evaluation value search measurement method, the optical disc apparatus 1 changes the spherical aberration correction value and focus bias value while monitoring the evaluation value z, searches for a plurality of measurement points that have the reference evaluation point $Z_{ref}$, and approximates the two-variable function using the spherical aberration correction values x and focus bias values y on the respective measurement points to thereby calculate the optimal spherical aberration correction value $x_0$ and optimal focus bias value $y_0$.

The optimal spherical aberration correction value $x_0$ and optimal focus bias value $y_0$ thus obtained are positioned at the center of the contour defined by the reference evaluation value $Z_{ref}$. Therefore, the optical disc apparatus 1 can increase the operation margin to the maximum extent possible to thereby realize stable recording/reproduction operation.

With the configuration described above, the optical disc apparatus 1 can adequately and quickly adjust the spherical aberration correction value and focus bias in the optical pickup 4.

(6) Other Embodiments

In the above embodiment, the spherical aberration correction values x and focus bias values y are used to approximate the two-variable function with the jitter value of an RF signal set as the evaluation value z and, based on the obtained two-variable function, the optimal spherical aberration correction value $x_0$ and optimal focus bias value $y_0$ on which the evaluation value z becomes the minimum are obtained. Alternatively, in addition to the jitter values, other various measurement values that specify the correction state of the spherical aberration in the optical pickup may be used as the evaluation value z in the present invention. In this case, the optimal spherical aberration correction value $x_0$ and optimal focus bias value $y_0$ on which the evaluation value z becomes the maximum or minimum (i.e., extreme value) should be calculated.

For example, in the case where the amplitude value (RF amplitude) of an RF signal is set as the evaluation value z, the optimal spherical aberration correction value $x_0$ and optimal focus bias value $y_0$ on which the evaluation value z becomes the maximum should be calculated.

Figure 12A:
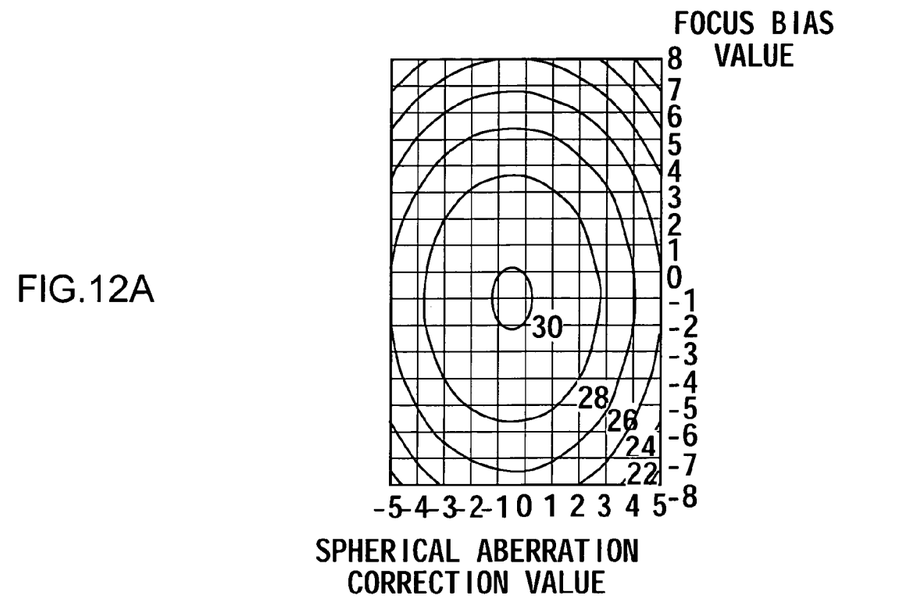
FIGS. 12A and 12B are characteristic views each representing evaluation values in the case where an RF amplitude is used as the evaluation value and an expression (1) is used.
Figure 12B:
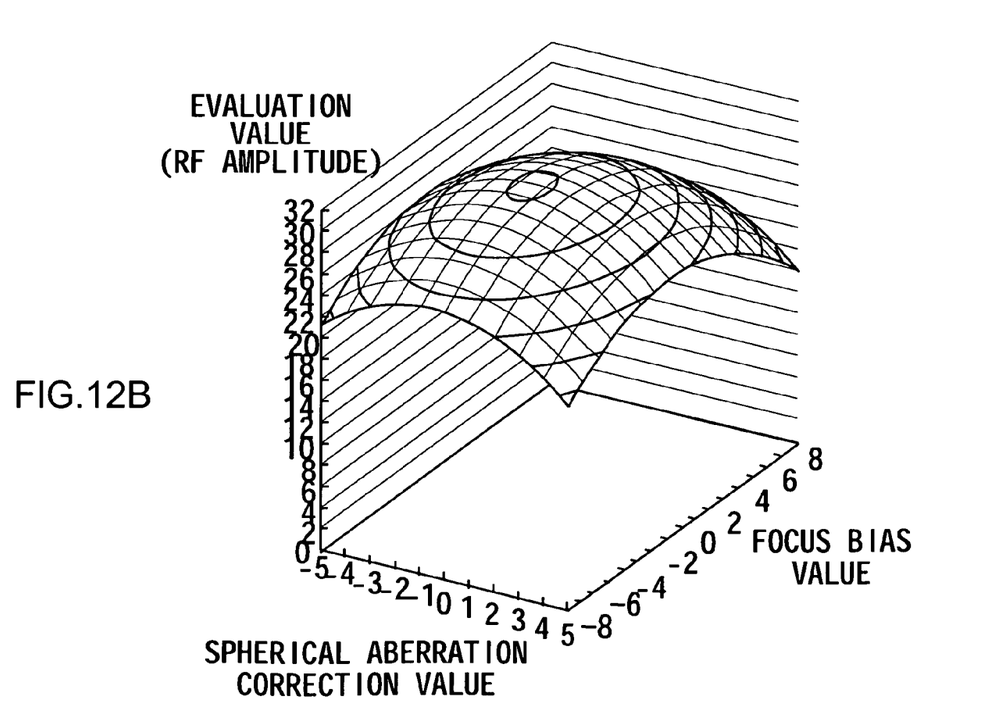

FIG. 12A shows the pattern of the evaluation value z on a two-dimensional plane defined by combinations of the spherical aberration correction values and focus bias values in the case where the RF amplitude is set as the evaluation value z and the above expression (1) is used. The pattern exhibits concentric ellipses with no bias centering on the position corresponding to the maximum RF amplitude value. FIG. 10B 3-dimensionally represents the pattern of evaluation value z. The pattern exhibits convexed concentric ellipses centering on the position corresponding to the maximum RF amplitude value.

Figure 13A:
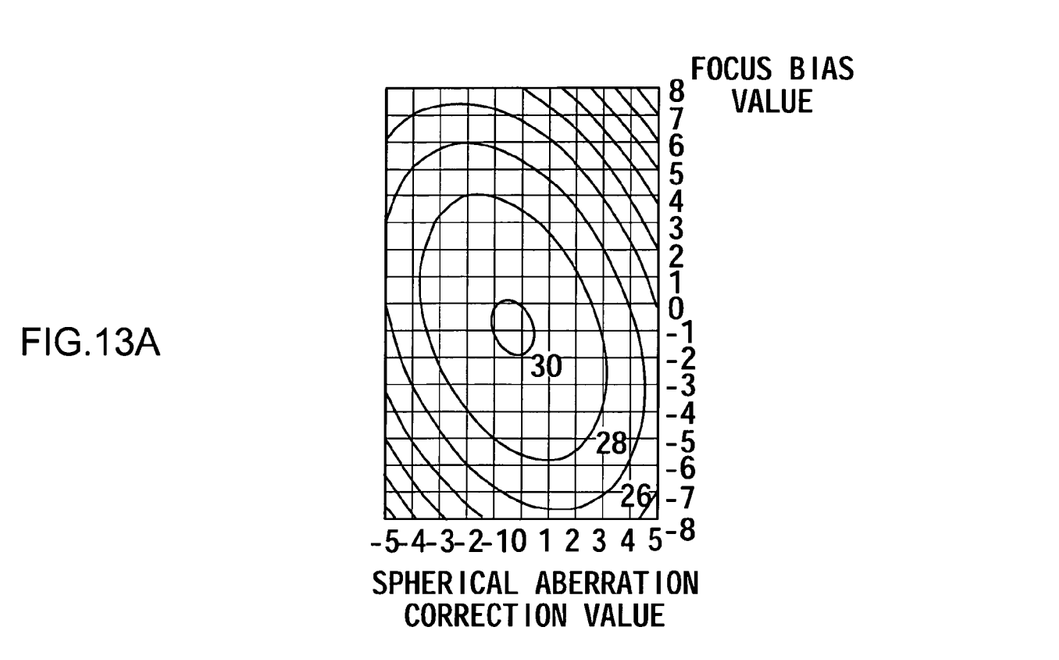
FIGS. 13A and 13B are characteristic views each representing evaluation values in the case where an RF amplitude is used as the evaluation value and an expression (2) is used.
Figure 13B:
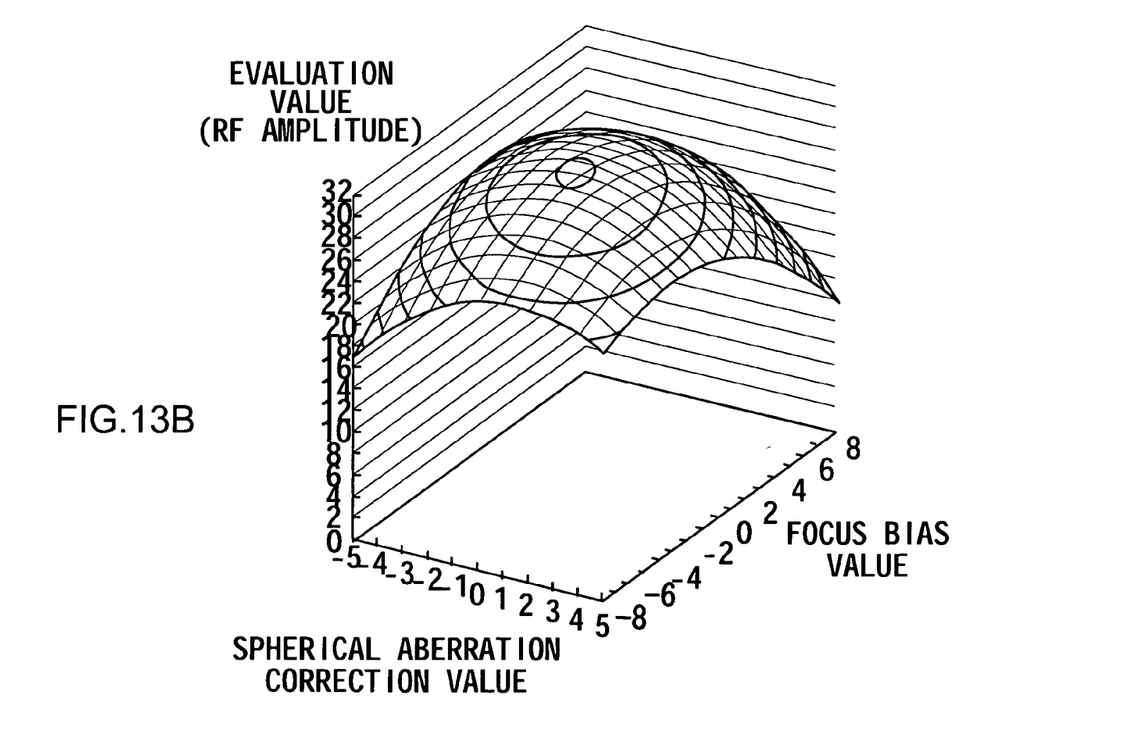

FIG. 13A shows the pattern of the evaluation value z on a two-dimensional plane defined by combinations of the spherical aberration correction values and focus bias values in the case where the RF amplitude is set as the evaluation value z and the above expression (2) is used. The pattern exhibits biased concentric ellipses centering on the position corresponding to the maximum RF amplitude value. FIG. 13B 3-dimensionally represents the pattern of evaluation value z. The pattern exhibits convexed concentric ellipses centering on the position corresponding to the maximum RF amplitude value.

Although the present invention is applied to the optical disc apparatus 1 in the above embodiment, the present invention may also be applied to other various electronic apparatuses such as a personal computer incorporating the optical disc apparatus 1.

The optical pickup control apparatus, optical pickup control method, and optical disc apparatus can be applied to various types of optical disc apparatus that require correction of the spherical aberration.

It should be understood by those skilled in the art that various modifications, combinations, sub-combinations and alternations may occur depending on design requirements and other factors insofar as they are within the scope of the appended claims or the equivalents thereof.

What is claimed is:

1. An optical pickup control apparatus provided in an optical disc apparatus that allows an optical pickup to irradiate an optical disc with a laser beam to record/reproduce data onto or from the optical disc, comprising:
   spherical aberration correction means for correcting a spherical aberration of the laser beam incident on the optical disc based on a spherical aberration correction value;
   focus bias adjustment means for adjusting a focus servo in the optical pickup for the optical disc based on a focus bias value;
   evaluation value generation means for generating an evaluation value from a signal based on a reflection light obtained by the optical pickup;
   function approximation means for approximating a two-variable function having the spherical aberration correction value and focus bias value as variables to the evaluation value based on spherical aberration correction values, focus bias values and evaluation values on a plurality of respective measurement points determined by combinations of the spherical aberration correction values and focus bias values; and
   optimal value calculation means for calculating, as an optimal value, the spherical aberration correction value and focus bias value on which the evaluation value becomes optimal based on the two-variable function obtained by the approximation of the function approximation means.

2. The optical pickup control apparatus according to claim 1, wherein
   the evaluation value is a jitter value of a reproduction RF signal, and
   the optimal value calculation means calculates, as an optimal value, the spherical aberration correction value and focus bias value on which the jitter value becomes a minimum based on the two-variable function.

3. The optical pickup control apparatus according to claim 1, wherein
   the evaluation value is an amplitude value of a reproduction RF signal, and
   the optimal value calculation means calculates, as an optimal value, the spherical aberration correction value and focus bias value on which the amplitude value becomes a maximum based on the two-variable function.

4. The optical pickup control apparatus according to claim 1, comprising:
   measurement target area detection means for detecting a measurement target area within which the evaluation value can stably be measured using a signal based on a reflection light obtained by the optical pickup, wherein
   the function approximation means sets a plurality of measurement points within the measurement target area to measure the evaluation value.

5. The optical pickup control apparatus according to claim 1, comprising:
   measurement point setting means for measuring the evaluation value while changing the spherical aberration correction value and focus bias value and setting a plurality of the measurement points on which the evaluation value corresponds to a predetermined reference evaluation value, wherein
   the function approximation means approximates the two-variable function based on the spherical aberration correction values, focus bias values, and evaluation values on the respective measurement points set by the measurement point setting means.

6. An optical pickup control method used in an optical disc apparatus that allows an optical pickup to irradiate an optical disc with a laser beam to record/reproduce data onto or from the optical disc, the optical pickup control method comprising:
   measuring an evaluation value obtained from a signal based on a reflection light obtained by the optical pickup on a plurality of measurement points each determined by a combination of a spherical aberration correction value for correcting a spherical aberration of the laser beam incident on the optical disc and a focus bias value of a focus servo in the optical pickup for the optical disc;
   approximating a two-variable function having the spherical aberration correction value and focus bias value as variables to the evaluation values based on the spherical aberration correction values, focus bias values and evaluation values; and
   calculating, as an optimal value, the spherical aberration correction value and focus bias value on which the evaluation value becomes optimal based on the two-variable function obtained by the approximating.

7. An optical disc apparatus that allows an optical pickup to irradiate an optical disc with a laser beam to record/reproduce data onto or from the optical disc. The optical disc apparatus comprising:
   spherical aberration correction means for correcting a spherical aberration of the laser beam incident on the optical disc based on a spherical aberration correction value;
   focus bias adjustment means for adjusting a focus servo in the optical pickup for the optical disc based on a focus bias value;

evaluation value generation means for generating an evaluation value from a signal based on a reflection light obtained by the optical pickup;

function approximation means for approximating a two-variable function having the spherical aberration correction value and focus bias value as variables to the evaluation value based on spherical aberration correction values, focus bias values and evaluation values on a plurality of respective measurement points determined by combinations of the spherical aberration correction values and focus bias values; and optimal value calculation means for calculating, as an optimal value, the spherical aberration correction value and focus bias value on which the evaluation value becomes optimal based on the two-variable function obtained by the approximation of the function approximation means.

8. An optical pickup control apparatus provided in an optical disc apparatus that allows an optical pickup to irradiate an optical disc with a laser beam to record/reproduce data onto or from the optical disc. The optical pickup control apparatus provided in an optical disc apparatus comprising:

a spherical aberration correction unit that corrects a spherical aberration of the laser beam incident on the optical disc based on a spherical aberration correction value;

a focus bias adjustment unit that adjusts a focus servo in the optical pickup for the optical disc based on a focus bias value;

an evaluation value generation unit that generates an evaluation value from a signal based on a reflection light obtained by the optical pickup;

a function approximation unit that approximates a two-variable function having the spherical aberration correction value and focus bias value as variables to the evaluation value based on spherical aberration correction values, focus bias values and evaluation values on a plurality of respective measurement points determined by combinations of the spherical aberration correction values and focus bias values; and an optimal value calculation unit that calculates, as an optimal value, the spherical aberration correction value and focus bias value on which the evaluation value becomes optimal based on the two-variable function obtained by the approximation of the function approximation unit.

9. An optical disc apparatus that allows an optical pickup to irradiate an optical disc with a laser beam to record/reproduce data onto or from the optical disc. The optical disc apparatus comprising:

a spherical aberration correction unit that corrects a spherical aberration of the laser beam incident on the optical disc based on a spherical aberration correction value;

a focus bias adjustment unit that adjusts a focus servo in the optical pickup for the optical disc based on a focus bias value;

an evaluation value generation unit that generates an evaluation value from a signal based on a reflection light obtained by the optical pickup;

a function approximation unit that approximates two-variable function having the spherical aberration correction value and focus bias value as variables to the evaluation value based on spherical aberration correction values, focus bias values and evaluation values on a plurality of respective measurement points determined by combinations of the spherical aberration correction values and focus bias values; and an optimal value calculation unit that calculates, as an optimal value, the spherical aberration correction value and focus bias value on which the evaluation value becomes optimal based on the two-variable function obtained by the approximation of the function approximation unit.

\* \* \* \* \*